(12) United States Patent
Ohtomo et al.

(10) Patent No.: US 9,335,161 B2
(45) Date of Patent: May 10, 2016

(54) ROTATION ANGLE MEASURING DEVICE

(71) Applicant: Kabushiki Kaisha TOPCON, Itabashi-ku, Tokyo-to (JP)

(72) Inventors: Fumio Ohtomo, Asaka (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/468,700

(22) Filed: Aug. 26, 2014

(65) Prior Publication Data

US 2015/0062579 A1 Mar. 5, 2015

(30) Foreign Application Priority Data

Sep. 2, 2013 (JP) ................................. 2013-181501

(51) Int. Cl.
*G01J 4/00* (2006.01)
*G01B 11/26* (2006.01)
*G01B 11/14* (2006.01)
*G01D 5/34* (2006.01)

(52) U.S. Cl.
CPC ................ *G01B 11/26* (2013.01); *G01B 11/14* (2013.01); *G01D 5/345* (2013.01); *G01J 4/00* (2013.01)

(58) Field of Classification Search
CPC ........... G01B 11/26; G01B 11/14; G01J 4/00; G01D 5/3473; G01D 5/345
See application file for complete search history.

(56) References Cited

U.S. PATENT DOCUMENTS 3,427,108 A 2/1969 Vyce
3,679,309 A * 7/1972 Hiragaki ............ G01N 21/6445
250/361 R (Continued)

FOREIGN PATENT DOCUMENTS

JP 8-304072 A 11/1996

OTHER PUBLICATIONS

European communication mailed Jan. 29, 2015 in corresponding European patent application No. 14182506.7.

*Primary Examiner* — Michael A Lyons
*Assistant Examiner* — Maurice Smith
(74) *Attorney, Agent, or Firm* — Nields, Lemack & Frame, LLC

(57) ABSTRACT

A rotation angle measuring device provided with a fixed unit and a movable unit relatively rotating with respect to the fixed unit, comprising a light source installed on either one of the fixed unit or the movable unit and for emitting a detection light and a reference position signal light, a polarizing plate for converting a detection light emitted from the light source to a polarized light, a polarized light rotating unit for rotating the polarized light around an optical axis of the light source as the center, a reference position signal light emitted at a reference rotating position of the polarized light, a stationary polarizing plate provided on either one of the fixed unit or the movable unit and to stand still with respect to a rotation of the polarized light, a photodetection sensor provided on the fixed unit or on the movable unit and for receiving the polarized light passing through the stationary polarizing plate and the reference position signal light, and an arithmetic unit for calculating a detection waveform of a change of light amount based on a signal from the photodetection sensor, for detecting the reference position signal light and for calculating a relative rotation angle between the fixed unit and the movable unit from a phase of the detection waveform and a predetermined detection reference phase when the reference position signal light is detected.

5 Claims, 5 Drawing Sheets

(56) References Cited

U.S. PATENT DOCUMENTS

| | | |
|---|---|---|
| 4,201,911 A | 5/1980 | Dering |
| 5,815,269 A | 9/1998 | Crabb et al. |
| 5,822,050 A | 10/1998 | Ohtomo et al. |
| 2002/0125412 A1 | 9/2002 | Barnett |
| 2005/0002032 A1 | 1/2005 | Wijntjes et al. |
| 2008/0186491 A1 | 8/2008 | Baxter et al. |
| 2013/0044318 A1* | 2/2013 | Cho ............... G01N 21/211 356/369 |

* cited by examiner

ROTATION ANGLE MEASURING DEVICE

BACKGROUND OF THE INVENTION

The present invention relates to a rotation angle measuring device.

As a device for measuring an angle of a rotating body, a measuring device and the like provided with an encoder has been known.

As a basic structure of an encoder, the encoder has a rotating plate where a pattern for angle detection is provided and an angle detecting unit for reading the pattern and for measuring an angle.

In a conventional type encoder, a positional relation between an angle detecting unit and a pattern for angle detection exerts influence on an accuracy of angle measurement. Therefore, in order to obtain a high-grade measurement accuracy, a manufacturing must be executed so that there are no deviation between the center of a pattern for detection and the center of a rotation plate, a runout of the rotation plate and de-centering, etc. This has resulted in high manufacturing cost, and also means that higher cost is required to produce a rotation angle measuring device with high accuracy.

SUMMARY OF THE INVENTION

It is an object of the present invention to provide a rotation angle measuring device, by which it is possible to perform an angle measurement at a low cost.

To attain the object as described above, a rotation angle measuring device according to the present invention provided with a fixed unit and a movable unit relatively rotating with respect to the fixed unit, comprising a light source installed on either one of the fixed unit or the movable unit and for emitting a detection light and a reference position signal light, a polarizing plate for converting a detection light emitted from the light source to a polarized light, a polarized light rotating unit for rotating the polarized light around an optical axis of the light source as the center, a reference position signal light emitted at a reference rotating position of the polarized light, a stationary polarizing plate provided on either one of the fixed unit or the movable unit and to stand still with respect to a rotation of the polarized light, a photodetection sensor provided on the fixed unit or on the movable unit and for receiving the polarized light passing through the stationary polarizing plate and the reference position signal light, and an arithmetic unit for calculating a detection waveform of a change of light amount based on a signal from the photodetection sensor, for detecting the reference position signal light and for calculating a relative rotation angle between the fixed unit and the movable unit from a phase of the detection waveform and a predetermined detection reference phase when the reference position signal light is detected.

Further, in the rotation angle measuring device according to the present invention, the polarized light rotating unit is to rotate the polarized light by one turn with respect to one relative rotation between the fixed unit and the movable unit and to sequentially increase the polarized light by multiplication of speed in grades as required, wherein the arithmetic unit acquires a detection waveform for each multiplication of speed and calculates a relative rotation angle based on the phase obtained at each detection waveform.

Further, in the rotation angle measuring device according to the present invention, the polarized light rotating unit rotates the polarizing plate.

Further, in the rotation angle measuring device according to the present invention, a light source unit has a light source for emitting a detection light and a marker light source for emitting a marker light, and an optical axis of the marker light source is arranged as deviated from an optical axis of the light source.

Further, in the rotation angle measuring device according to the present invention, the photodetection sensor is provided integrally with the stationary polarizing plate and is so arranged that a detection light passing through the stationary polarizing plate is received by the photodetection sensor.

Furthermore, in the rotation angle measuring device according to the present invention, the light source unit, a condenser lens, a rotary polarizing plate and the photodetection sensor are provided on either one of the fixed unit or the movable unit, the stationary polarizing plate and a mirror to correspond with the stationary polarizing plate are provided, and configured so that a detection light passing through the rotary polarizing plate and the stationary polarizing plate is reflected by the mirror, and enters the photodetection sensor.

According to the present invention, the rotation angle measuring device provided with a fixed unit and a movable unit relatively rotating with respect to the fixed unit, comprising a light source installed on either one of the fixed unit or the movable unit and for emitting a detection light and a reference position signal light, a polarizing plate for converting a detection light emitted from the light source to a polarized light, a polarized light rotating unit for rotating the polarized light around an optical axis of the light source as the center, a reference position signal light emitted at a reference rotating position of the polarized light, a stationary polarizing plate provided on either one of the fixed unit or the movable unit and to stand still with respect to a rotation of the polarized light, a photodetection sensor provided on the fixed unit or on she movable unit and for receiving the polarized light passing through the stationary polarizing plate and the reference position signal light, and an arithmetic unit for calculating a detection waveform of a change of light amount based on a signal from the photodetection sensor, for detecting the reference position signal light and for calculating a relative rotation angle between the fixed unit and the movable unit from a phase of the detection waveform and a predetermined detection reference phase when the reference position signal light is detected. As a result, high mechanical accuracy is not required between the fixed unit and the movable unit, and the rotation angle measuring device can be simple structured and at a low cost.

Further, according to the present invention, in the rotation angle measuring device, the polarized, light rotating unit is to rotate the polarized light by one turn with respect to one relative rotation between the fixed unit and the movable unit and to sequentially increase the polarized light by multiplication of speed in grades as required, wherein the arithmetic unit acquires a detection waveform for each multiplication of speed and calculates a relative rotation angle based on the phase obtained at each detection waveform. As a result, it becomes possible to easily carry out a highly accurate measurement with a simple structure.

Further, according to the present invention, in the rotation angle measuring device, the polarized light rotating unit rotates the polarizing plate. As a result, a polarized light with a rotatable polarizing direction can be easily obtained, and since it will suffice if the polarizing direction is changed for the polarizing plate, it is not necessary to adjust the rotation center with high accuracy.

Further, according to the present invention, in the rotation angle measuring device, a light source unit has a light source for emitting a detection light and a marker light source for emitting a marker light, and an optical axis of the marker light source is arranged as deviated from an optical axis of the light source. As a result, it becomes easier to make a judgment when the phase is detected.

Furthermore, according to the present invention, in the rotation angle measuring device, the light source unit, a condenser lens, a rotary polarizing plate and the photodetection sensor are provided on either one of the fixed unit or the movable unit, the stationary polarizing plate and a mirror to correspond with the stationary polarizing plate are provided, and configured so that a detection light passing through the rotary polarizing plate and the stationary polarizing plate is reflected by the mirror, and enters the photodetection sensor. As a result, members which require electric power can be put together in either one of the fixed unit or the movable unit, and an electrical structure becomes easy.

BRIEF DESCRIPTION OF THE DRAWINGS

FIG. 3A shows a case where the rotary polarizing plate is rotated at a 1-fold speed and FIG. 3B shows a case where the rotary polarizing plate is rotated at a 10-fold speed.

FIG. 4A shows a case where the rotation of the rotary polarizing plate is at a 1-fold speed, FIG. 4B shows a case where the rotation of the rotary polarizing plate is at a 10-fold speed and FIG. 4C shows a case where the rotation of the rotary polarizing plate is at a 100-fold speed.

FIG. 6A shows a case where there is no deviation of an optical axis between a fixed unit and a movable unit and FIG. 6B shows a case where there is a deviation of an optical axis between the fixed unit and the movable unit.

DETAILED DESCRIPTION OF THE PREFERRED EMBODIMENTS

Description will be given below on embodiments of the present invention by referring to the attached drawings.

First, by referring to FIG. 1, description will be given on basic arrangement of a rotation angle measuring device 1 according to the present invention.

Figure 1:
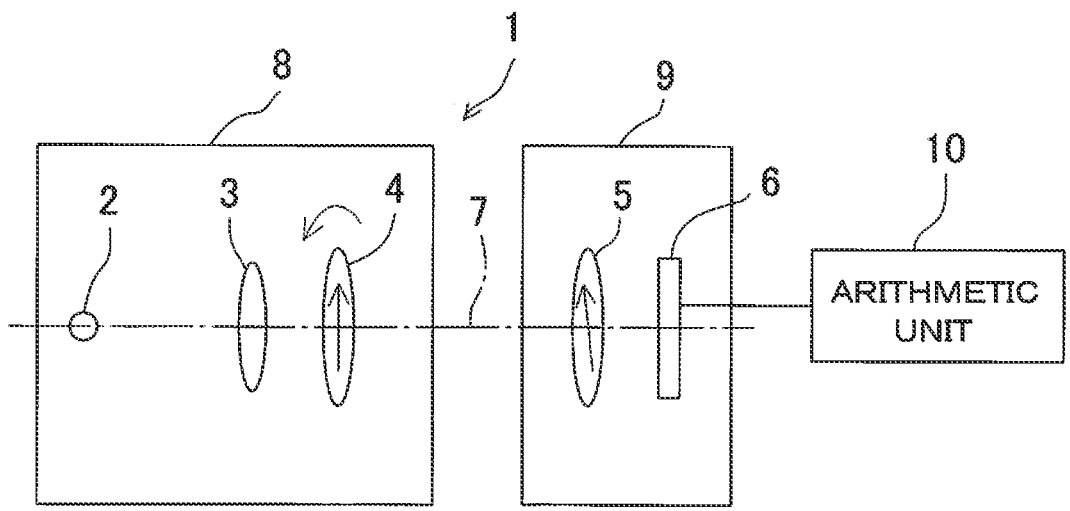
FIG. 1 is a drawing to show a basic arrangement of a rotation angle measuring device according to an embodiment of the present invention.

In FIG. 1, reference numeral 2 denotes a light source unit, reference numeral 3 denotes a condenser lens, reference numeral 4 denotes a rotary polarizing plate, reference numeral 5 denotes a stationary polarizing plate and reference numeral 6 denotes a photodetection sensor. The light source unit 2, the condenser lens 3, the rotary polarizing plate 4, the stationary polarizing plate 5 and the photodetection sensor 6 are disposed on the same optical axis 7. A photodetection signal outputted by the photodetection sensor 6 is inputted to an arithmetic unit 10.

The light source unit 2 is a light emitting diode, for instance. The light source unit 2 emits a detection light, which is a medium of an angle detection, and the condenser lens 3 makes the detection light emitted from the light source unit 2 to parallel light fluxes. The rotary polarizing plate 4 is rotated around the optical axis 7 as the center at a predetermined speed, more preferably, at a constant speed, and the stationary polarizing plate 5 is fixed.

The rotary polarizing plate 4 is considered to be a reference rotating position when the polarizing direction is at a predetermined angle (e.g. at −22.5°) with respect to reference direction of a fixed unit 8. Further, a polarizing direction of the stationary polarizing plate 5 is set at a predetermined angle (e.g. at +22.5°) with respect to reference direction of a movable unit 9, and a phase, at which a reference direction of the fixed unit 8 coincides with a reference direction of the movable unit 9, is regarded as a detection reference phase. Therefore, a polarizing relation becomes 45° when a detection reference phase, and the polarizing relation is set in such a manner that a change ratio of a waveform will be at the maximum (when the phase of sine wave is 0). It is to be noted that the detection reference phase can be set to an arbitrary phase and the detection reference phase is not limited to a case where the phase is 0.

When a detection light emitted from the light source unit 2 passes through the rotary polarizing plate 4, the detection light becomes a polarized light. Further, when the rotary polarizing plate 4 rotates, a polarizing direction of the polarized beam rotates. Therefore, a light amount of the polarized beam, which passes through the stationary polarizing plate 5 and is received by the photodetecting sensor 6, changes depending on a relation with a polarizing direction of the stationary polarizing plate 5, and a detection waveform of the light amount becomes a 2-cycle sine waveform with respect to one rotation of the rotary polarizing plate 4. The arithmetic unit 10 calculates and acquires a detection waveform based on a photodetection signal from the photodetection sensor 6.

It is to be noted that the light source unit 2 emits a detection light and issues a light pulse when the rotary polarizing plate 4 reaches a reference rotating position. The light pulse is superimposed or the like on the detection light and is added to the detection light as a reference position signal light which indicates a reference rotating position.

The photodetection sensor 6 outputs a photodetection signal corresponding to the received light amount. Further, a reference position signal light is detected from the photodetection signal of the photodetection sensor 6.

The arithmetic unit 10 obtains a phase relation in the sine waveform based on the photodetection signal, a reference position signal light detected and the detection waveform. Further, a relative rotation angle between the fixed unit 8 and the movable unit 9 is determined.

Further, in a case where there is a relative rotation between the fixed unit 8 and the movable unit 9, the detection waveform will be a sine wave of two cycles per every one rotation of the rotary polarizing plate, so ½ of a phase angle obtained becomes a relative rotation angle.

Further, by setting the rotation angle of the rotary polarizing plate 4 to 10 rotations or 100 rotations per every one rotation between the fixed unit 8 and the movable unit 9, a measurement accuracy will be improved by 10 times or by 100 times. It is to be noted that a multiplication of speed is not limited to 10 times or 100 times and arbitrary multiplication of speed can be selected. For instance, it may be 2 times, 8 times, 20 times or 400 times, and in the embodiment, as given above, multiplications of speed is set to 3 grades, while it may be set to 4 grades or 5 grades.

Figure 2:
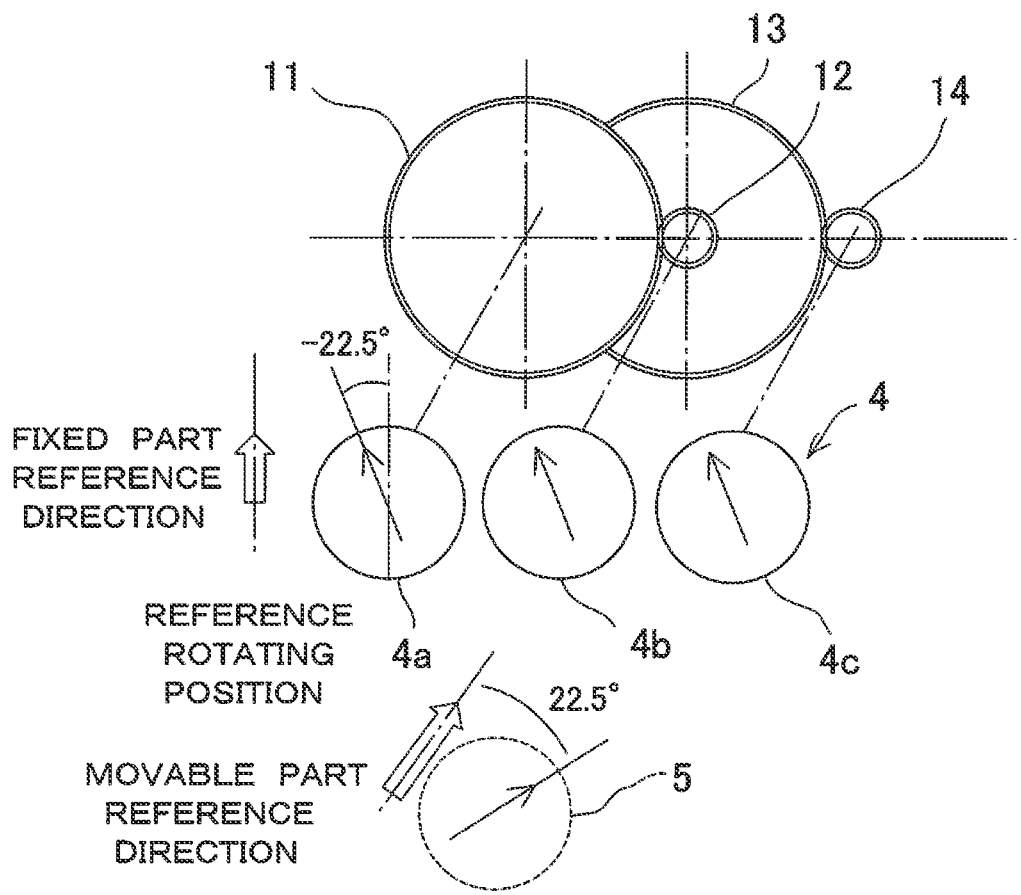
FIG. 2 is an explanatory drawing to show an example in which efforts are made to attain high accuracy by mechanically increasing the speed of rotation of a rotary polarizing plate in order to explain a general concept of the present invention.

FIG. 2 shows an example where the speed of the rotary polarizing plate 4 is mechanically increased, to explain a general concept of the improvement of accuracy. Further, as a means for increasing the speed, a motor is used, and speed increase can be accomplished by increasing the number of rotations of the motor.

FIG. 2 shows the rotary polarizing plate 4. The rotary polarizing plate 4 has a plurality of rotary polarizing plates 4a, 4b and 4c, and it is so arranged that the rotary polarizing plates 4a, 4b and 4c are rotated at different rotation speeds.

In FIG. 2, reference numeral 11 denotes a first gear rotated by a motor, reference numeral 12 denotes a second gear engaged with the first gear 11, reference numeral 13 denotes a third gear integrally rotated with the second gear 12, and reference numeral 14 denotes a fourth gear to be engaged with the third gear 13. Reference numeral 4a denotes a first rotary polarizing plate connected with a rotation shaft of the first gear 11, reference numeral 4b denotes a second rotary polarizing plate connected with a rotation shaft of the third gear 13 and reference numeral 4c denotes a third rotary polarizing plate connected with a rotation shaft of the fourth gear 14.

When all of the polarizing directions of the first rotary polarizing plate 4a, the second rotary polarizing plate 4b and the third rotary polarizing plate 4c are coincided with −22.5° with respect to a reference direction of the fixed unit 8, the first rotary polarizing plate 4a, the second rotary polarizing plate 4b and the third rotary polarizing plate 4c are at a reference rotating position. On the other hand, because the stationary polarizing plate 5 is set to 22.5° with respect to a reference direction of the movable unit 9, by measuring a phase of a detection waveform at a reference rotating position corresponding to the rotary polarizing plates 4a, 4b and 4c respectively, and by measuring a phase difference to a detection reference phase where all phases become almost zero, it is possible to accomplish angle measurement with high precision. FIG. 2 shows a condition at this time.

Figure 3:
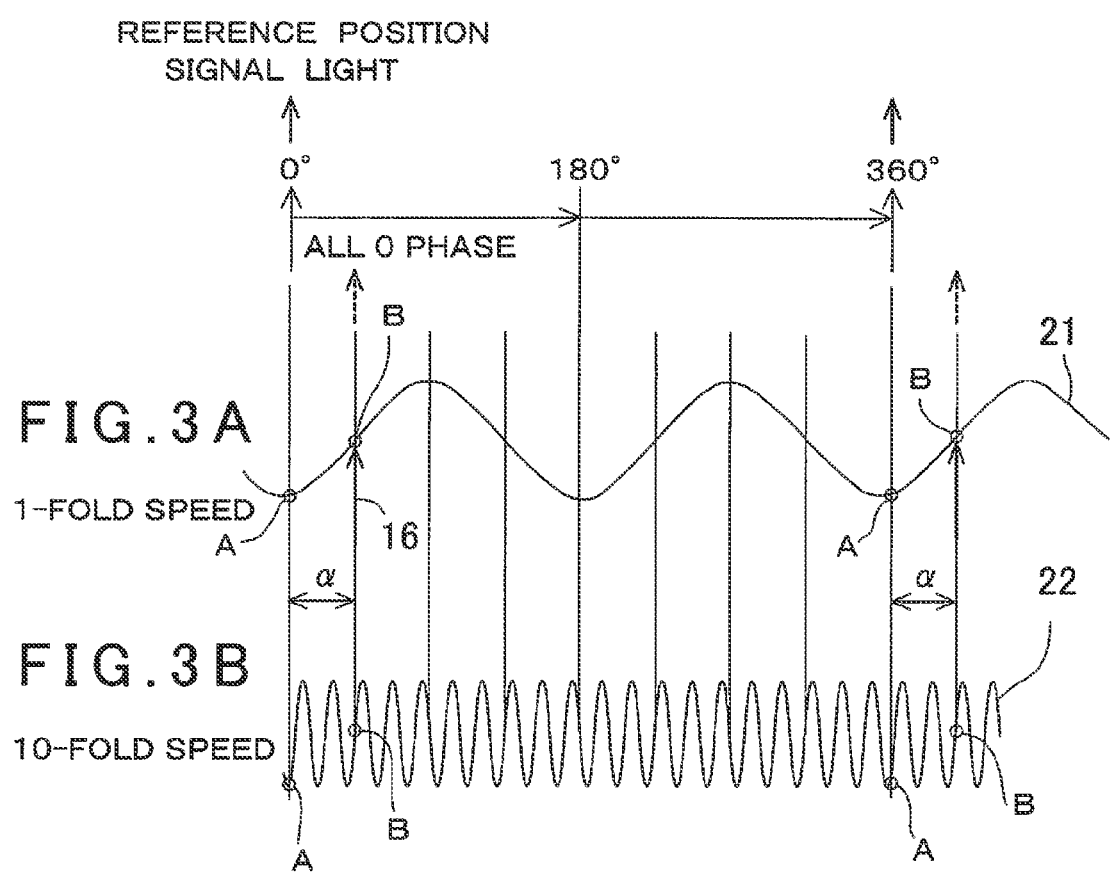
FIG. 3A and FIG. 3B each shows a detection waveform obtained by the rotation of the rotary polarizing plate.

FIG. 3A shows a detection waveform 21 of a photodetection signal from a photodetection sensor 6 in a case where the first rotary polarizing plate 4a is rotated at 1-fold speed and FIG. 3B shows a detection waveform 22 of a photodetection signal from the photodetection sensor 6 in a case where the second rotary polarizing plate 4b is rotated at 10-fold speed.

Because the second rotary polarizing plate 4b rotates at a speed 10 times higher than a speed of the first rotary polarizing plate 4a, the photodetection signal from the photodetection sensor 6, when the second rotary polarizing plate 4b is rotated, changes at a frequency 10 times higher than a frequency of the photodetection signal when the first rotary polarizing plate 4a is rotated.

A point A in the detection waveform 21 in FIG. 3A is a phase when the reference position signal light is detected and a point B is a detection reference phase where all of the rotary polarizing plates 4a, 4b and 4c become almost 0 phase. A symbol 16 shows a photodetection signal at a time of the detection reference phase.

A phase difference between point A and point B in the detection waveform 21 is a phase difference at 1-fold speed, and the phase difference is used for an approximate angle measurement. Further, a phase difference between point A and point B in the detection waveform 22 is a phase difference at 10-fold speed, and the phase difference is used for a precise angle measurement.

Therefore, ½ of phase difference between point A and point B is a relative rotation angle between the rotary polarizing plate 4 and the stationary polarizing plate 5. That is, a rotation angle of the movable unit 9 with respect to the fixed unit 8 can be measured.

Figure 4:
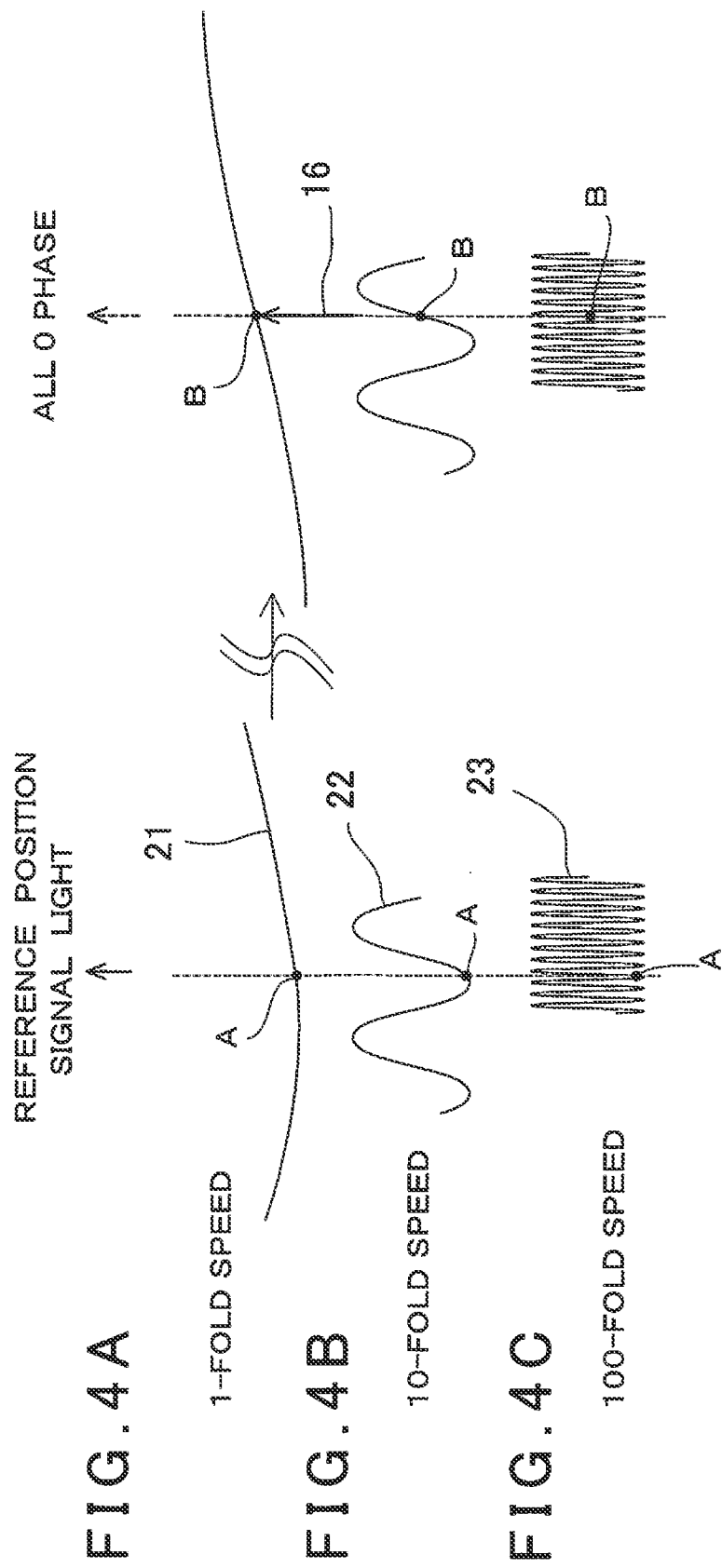
FIG. 4A to FIG. 4C each shows a detection waveform obtained by the rotation of the rotary polarizing plate.

Each of FIG. 4A, FIG. 4B and FIG. 4C shows a detection waveform 21 of a photodetection signal from the photodetection sensor 6 when the first rotary polarizing plate 4a is rotated at 1-fold speed, a detection waveform 22 of a photodetection signal from the photodetection sensor 6 when the second rotary polarizing plate 4b is rotated at 10-fold speed, and a detection waveform 23 of a photodetection signal from the photodetection sensor 6 when the third rotary polarizing plate 4c is rotated at 100-fold speed.

As shown in the figures, phases of point A and point B are acquired from the detection waveform 21, the detection waveform 22 and detection waveform 23 when a reference position signal light is detected.

A rotation angle of a value of an upper grade (approximate) can be measured by detecting the phase in the detection waveform 21, a rotation angle of a value of a middle grade (moderately precise) can be measured by detecting the phase in the detection waveform 22, and a rotation angle of a value of a lower grade (highly precise) can be measured by detecting the phase in the detection waveform 23.

As described above, one rotation corresponds to 360° at 1-fold speed, at 10-fold speed, 10 rotations correspond to 360° and at 100-fold speed, 100 rotations correspond to 360°. Further, because one rotation consists of 2 cycles, a phase angle obtained from each of the detection waveforms 21, 22 and 23 corresponds to ½, ½₀ and ½₀₀, respectively, as rotation angles.

By increasing the number of revolutions of the rotary polarizing plate 4, values at lower levels can be accurately measured in a sequential manner, and by generalizing the phase obtained by the detection waveform 21, the detection waveform 22 and the detection waveform 23, it becomes possible to perform a rotation angle measurement with high accuracy. That is, in the present embodiment, by increasing a rotation speed of the rotary polarizing plate 4, a measurement accuracy can be easily improved.

Further, in the present embodiment, since only a deviation in polarizing direction between the rotary polarizing plate 4 and the stationary polarizing plate 5 are detected, a center deviation between the center of the rotary polarizing plate 4 and the center of the stationary polarizing plate 5, and also, a center deviation between the center of the fixed unit 8 and the center of the movable unit 9 do not exert extensive influence on the measurement accuracy. Therefore, when the fixed unit 8 and the movable unit 9 are manufactured, highly accurate fabrication and highly accurate assembling are not required.

By rotating the rotary polarizing plate 4 by one turn (360°), the detection waveform 21 of 2 cycles can be obtained. For this reason, it is not possible to judge whether the waveform obtained belongs to the 0° to 180° range or to the 180° to 360° range only from the curve of the detection waveform 21.

In order to judge as to which rotation range the waveform belongs, a marker is provided on the light source side. In this case, the light source unit 2 comprises a light source to emit a detection light and a light source to emit a marker light.

Figure 5:
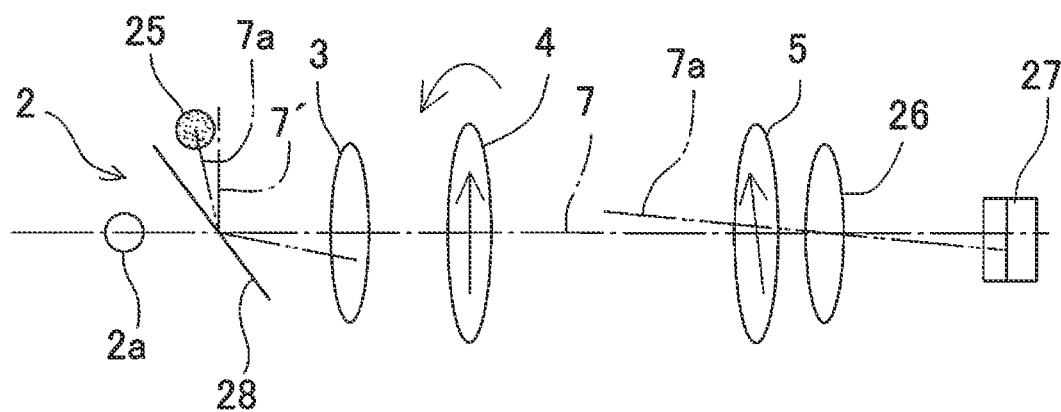
FIG. 5 is a drawing to show an approximate arrangement of a case where a marker light source for judging a rotating position of the rotary polarizing plate is provided in the present invention.

FIG. 5 shows one example of a case where a marker is provided on a light source side. In FIG. 5, the same component as shown in FIG. 1 is referred by the same symbol. Further, in FIG. 5, reference numeral 25 denotes a marker light source, reference numeral 26 denotes a condenser lens, and reference numeral 27 denotes a photodetection sensor.

The marker light source 25 is provided at a position where an optical length is equal to or approximately equal to the light source 2a with respect to the condenser lens 3, and the marker light source 25 is provided at a position deviated from an optical axis 7.

In FIG. 5, a half mirror 28 is arranged between the light source 2a and the condenser lens 3 and a marker light source 25 is arranged at a position deviated from a reflection optical axis 7' of the half mirror 28. In FIG. 5, reference numeral 7a denotes an optical axis 7a of the marker light source 25.

The marker light source 25 is emitted so that it can be discriminated with respect to the light source 2a. For instance, it is so arranged that a light emitted by the light source 2a has a color different from a color of a light emitted by the marker light source 25. Or, a flashing light is used as one of them and a continuous light is used as the other.

It would suffice if the photodetection sensor 27 can detect the light from the light source 2a and the light from the marker light source 25, while a CCD or a CMOS sensor or the like, which can specify a photodetection position, may be used. Further, a 4-division sensor may be used as a sensor which can specify the photodetecting position.

Figure 6A:
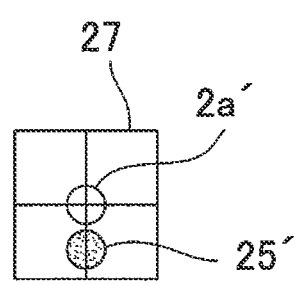
FIG. 6A and FIG. 6B each shows a condition where a light source image and a marker image are detected.

FIG. 6A shows a case where a 4-division sensor is used as the photodetection sensor 27.

A 4-division sensor detects a photodetecting position when each of the divided photodetection units 27a, 27b, 27c and 27d produces a photodetection signal respectively and by detecting a difference of photodetection light amounts between the photodetection units 27a, 27b, 27c and 27d.

A light source image 2a' of the light source 2a and a marker light source image 25' of the marker light source 25 projected on the photodetection sensor 27 are projected in an integrated manner. As a result, a judgment can be made by detecting a direction of deviation between the light source image 2a' and the marker light source image 25'.

Figure 6B:
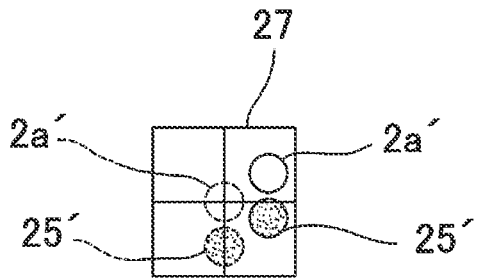

Further, in a case where an optical axis of the fixed unit 8 coincides with an optical axis of the movable unit 9, the light source image 2a' is projected on the center of the photodetection sensor 27 as shown in FIG. 6A. However, in a case where there is deviation or an inclination between an optical axis of the fixed unit 8 and an optical axis of the movable unit 9, the light source image 2a' deviates from the center of the photodetection sensor 27 as shown in FIG. 6B. Therefore, in a case where a photodetection sensor, in which a photodetecting position can be specified, is used as the photodetection sensor 27, it is possible to detect a deviation from the optical axis and an inclination of the optical axis.

Figure 7:
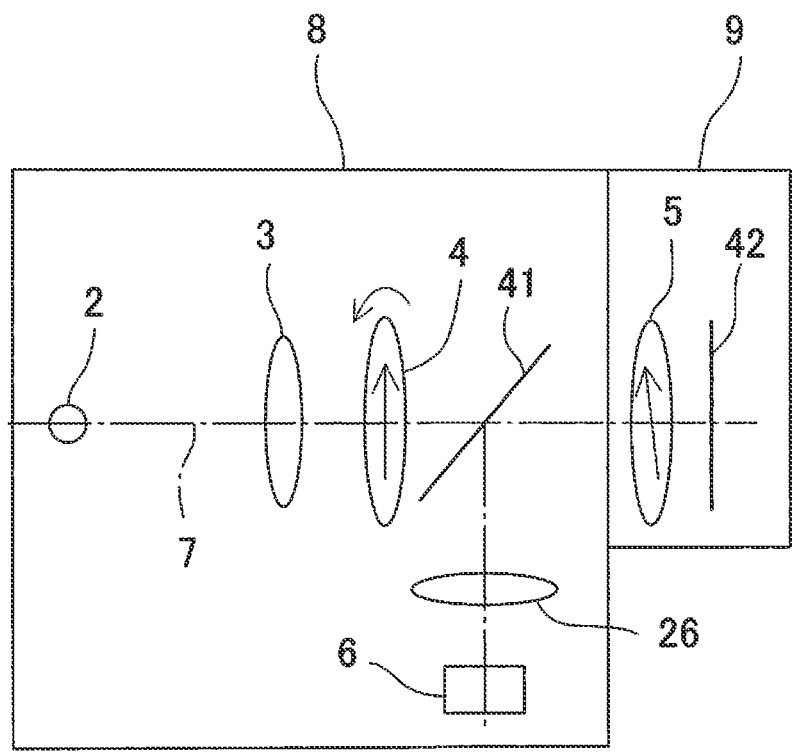
FIG. 7 is a drawing to snow approximate arrangement of another embodiment.

FIG. 7 shows another variation example.

On an optical axis 7, a light source 2, a condenser lens 3, a rotary polarizing plate 4, a half mirror 41, a stationary polarizing plate 5 and a mirror 42 are arranged, and a condenser lens 26 and a photodetection sensor 6 are arranged on a reflection optical axis of the half mirror 41.

Further, the light source 2, the condenser lens 3, the rotary polarizing plate 4, the half mirror 41, the condenser lens 26 and the photodetection sensor 6 are provided on a fixed unit 8, and the stationary light polarizing plate 5 and the mirror 42 are provided on a movable unit 9.

A light emitted from the light source 2 becomes a rotating polarized light by passing through the rotary polarizing plate 4, the polarized light passes through the half mirror 41, and further, passes through the stationary polarizing plate 5 and enters the mirror 42. The polarized light reflected by the mirror 42 is reflected by the half mirror 41 and is received by the photodetection sensor 6.

The light amount received by the photodetection sensor 6 changed as shown in FIG. 3A after the rotary polarized light passes through the stationary polarizing plate 5, and a rotation angle of the movable unit 9 is determined based on the result of photodetection of the photodetection sensor 6.

In the another variation example, a portion requiring electric power can be accommodated in a fixed part, and there is no need to supply electric power to the movable unit 9. This makes at possible to simplify electrical wiring and arrangement.

The invention claimed is:

1. A rotation angle measuring device provided with a fixed object and a movable object relatively rotating with respect to said fixed object, comprising a light source installed on either one of said fixed object or said movable object and for emitting a detection light and a reference position signal light, a polarizing plate for converting a detection light emitted from said light source to a polarized light, a polarized light rotating unit for rotating said polarized light around an optical axis of said light source as the center, said reference position signal light emitted at a reference rotating position of said polarized light, a stationary polarizing plate provided on the other one of said fixed object or said movable object and to stand still with respect to a rotation of said polarized light, a photodetection sensor provided on the other one of the fixed object or on said movable object and for receiving said polarized light passing through said stationary polarizing plate and said reference position signal light, and an arithmetic unit for calculating a detection waveform of a change of light amount based on a signal from said photodetection sensor, for detecting said reference position signal light and for calculating a relative rotation angle between said fixed object and said movable object from a phase of said detection waveform and a predetermined detection reference phase when said reference position signal light is detected, and wherein said polarized light rotating unit is to rotate said polarized light by one turn with respect to one relative rotation between said fixed object and said movable object and to sequentially increase a rotation rate of said polarized light by multiplication of speed in grades as required, wherein said arithmetic unit acquires a detection waveform for each multiplication of speed and calculates a relative rotation angle based on the phase obtained at each detection waveform.

2. A rotation angle measuring device according to claim 1, wherein said polarized light rotating unit rotates said polarizing plate.

3. A rotation angle measuring device according to claim 1, wherein said light source unit has a light source for emitting said detection light and a marker light source for emitting a marker light as said reference position signal light, and an optical axis of said marker light source is arranged as deviated from an optical axis of said light source.

4. A rotation angle measuring device according to claim 1, wherein said photodetection sensor is provided integrally with said stationary polarizing plate and is so arranged that said detection light passing through said stationary polarizing plate is received by said photodetection sensor.

5. A rotation angle measuring device provided with a fixed object and a movable object relatively rotating with respect to said fixed object, comprising a light source installed on either one of said fixed object or said movable object and for emitting a detection light and a reference position signal light, a polarizing plate for converting a detection light emitted from said light source to a polarized light, a polarized light rotating unit for rotating said polarized light around an optical axis of said light source as the center, said reference position signal light emitted at a reference rotating position of said polarized light, a stationary polarizing plate provided on either one of said fixed object or said movable object and to stand still with respect to a rotation of said polarized light, a photodetection sensor provided on said fixed object or on said movable object and for receiving said polarized light passing through said stationary polarizing plate and said reference position signal light, and an arithmetic unit for calculating a detection waveform of a change of light amount based on a signal from said photodetection sensor, for detecting said reference position signal light and for calculating a relative rotation angle between said fixed object and said movable object from a phase of said detection waveform and a predetermined detection reference phase when said reference position signal light is detected, and wherein said light source unit, a condenser lens, said polarizing plate and said photodetection sensor are provided on either one of said fixed object or said movable object, said stationary polarizing plate and a mirror to correspond with said stationary polarizing plate are provided on the other one of said fixed object and said movable object, and configured so that said detection light passing through said polarizing plate and said stationary polarizing plate is reflected by said mirror, and enters said photodetection sensor.

* * * * *